United States Patent [19]

Murata

[11] 4,332,755

[45] Jun. 1, 1982

[54] SINTERED SILICON CARBIDE - ALUMINUM NITRIDE ARTICLES AND METHOD OF MAKING SUCH ARTICLES

[75] Inventor: Yorihiro Murata, North Tonawanda, N.Y.

[73] Assignee: Kennecott Corporation, Stamford, Conn.

[21] Appl. No.: 218,589

[22] Filed: Dec. 19, 1980

Related U.S. Application Data

[63] Continuation-in-part of Ser. No. 102,061, Dec. 10, 1979, abandoned, which is a continuation of Ser. No. 915,644, Jun. 15, 1978, abandoned.

[51] Int. Cl.$^3$ .................... C04B 35/56; C04B 35/58
[52] U.S. Cl. ........................................ 264/65; 501/89
[58] Field of Search ............... 106/44; 264/65; 501/89

[56] References Cited

U.S. PATENT DOCUMENTS

| | | | |
|---|---|---|---|
| 2,406,275 | 8/1946 | Wejnarth | 106/44 |
| 3,259,509 | 7/1966 | Matkovich et al. | 106/44 |
| 3,492,153 | 1/1970 | Ervin, Jr. | 106/44 |
| 3,833,389 | 9/1974 | Kaneya et al. | 106/44 |
| 3,993,602 | 11/1976 | Prochagka | 106/44 |
| 4,080,415 | 3/1978 | Coppola et al. | 264/65 |
| 4,123,286 | 10/1978 | Coppola et al. | 106/44 |
| 4,135,938 | 1/1979 | Murata et al. | 264/65 |
| 4,179,299 | 12/1979 | Coppola et al. | 106/44 |

FOREIGN PATENT DOCUMENTS

| | | |
|---|---|---|
| 949471 | 2/1964 | United Kingdom . |
| 952554 | 3/1964 | United Kingdom . |
| 1054631 | 1/1967 | United Kingdom . |
| 1055231 | 1/1967 | United Kingdom . |
| 1160755 | 8/1969 | United Kingdom . |

Primary Examiner—Mark Bell
Attorney, Agent, or Firm—Raymond W. Green; William H. Holt; Donald C. Studley

[57] ABSTRACT

Sintered ceramic products comprised of from about 55 to about 99.5 percent by weight of silicon carbide co-sintered with from about 0.5 to about 45 percent by weight aluminum nitride containing a dispersion of free carbon in amounts between about 0.5 and about 4.0 percent by weight of the product are described. The sintered products have a bulk density of at least 75 percent of the theoretical density of silicon carbide. The products are produced by sintering, under substantially pressureless conditions, mixtures of silicon carbide, carbon, or a carbon source material, and aluminum nitride. The aluminum nitride component, in ranges of from about 3.0 to about 45 percent, may be initially mixed with the silicon carbide and carbon or carbon source material. In ranges of from about 0.5 to about 3.0 percent, the aluminum nitride component may be added to the mixture in vapor form during sintering.

17 Claims, No Drawings

SINTERED SILICON CARBIDE - ALUMINUM NITRIDE ARTICLES AND METHOD OF MAKING SUCH ARTICLES

CROSS-REFERENCES TO RELATED APPLICATIONS

This is a continuation-in-part of copending application Ser. No. 102,061, filed Dec. 10, 1979, which is a continuation of application Ser. No. 915,644, filed June 15, 1978, both now abandoned.

BACKGROUND OF THE INVENTION

Silicon carbide, a crystalline compound of silicon and carbon, has long been known for its hardness, its strength and its excellent resistance to oxidation and corrosion. Silicon carbide has a low coefficient of expansion, good heat transfer properties and maintains high strength at elevated temperatures. In recent years, the art of producing high density silicon carbide bodies from silicon carbide powders has been developed. Methods include reaction bonding, chemical vapor deposition, hot pressing and pressureless sintering (initially forming the article and subsequently sintering). Examples of these methods are described in U.S. Pat. Nos. 3,853,566; 3,852,099; 3,954,483; and 3,960,577. The high density silicon carbide bodies so produced are excellent engineering materials and find utility in fabrication of components for turbines, heat exchange units, pumps and other equipment or tools that are exposed to severe wear and/or operation under high temperature conditions.

In order to obtain high density and high strength silicon carbide ceramic materials, various additives have been utilized. For example, a method of hot pressing silicon carbide to densities in order of 98 percent of theoretical by addition of aluminum and iron as densification aids is disclosed by Alliegro, et al., J. Ceram. Soc., Vol. 39, No. 11, November, 1965, pages 386 to 389. They found that a dense silicon carbide could be produced from a powder mixture containing 1 percent by weight of aluminum. Their product had a modulus of rupture of 54,000 psi. at room temperature and 70,000 psi at 1371° C.

Aluminum nitride, a crystalline compound of aluminum and nitrogen, is widely used as a refractory material. Aluminum nitride exhibits an excellent resistance to molten metals and is an especially useful refractory for molten aluminum. Aluminum nitride has good thermal shock resistance, good strength and excellent resistance to most chemicals.

A number of proposals have been made to combine silicon carbide and aluminum nitride to produce an improved high density body which may be fabricated into articles which will withstand severe operating conditions, or into refractory materials which offer the strength of silicon carbide and the inertness of aluminum nitride. Such combinations have been proposed to improve the electrical conductivity of silicon carbide resistance elements and better the resistance of silicon carbide to corrosion at elevated temperatures. Examples of such mixtures are found in U.S. Pat. Nos. 3,259,509; 3,287,478; and 3,492,153. However, the previously proposed products are mixtures of silicon carbide and aluminum nitride which do not sinter to produce a high density, co-sintered product. One negative characteristic of aluminum nitride is that it is soluble in warm water. This characteristic has lessened the use of aluminum nitride in many applications in which it would otherwise be utilized to an advantage. The mixtures proposed in the prior art have not substantially remidied the solubility of aluminum nitride in warm water. It has now been found that a co-sintered silicon carbide - aluminum nitride product, containing up to about 45 percent be weight aluminum nitride, may be produced which has the positive attributes of both silicon carbide and aluminum nitride and which is substantially insoluble in warm water.

BRIEF DESCRIPTION OF THE INVENTION

The sinterable mixtures of the present invention comprise silicon carbide, carbon and aluminum nitride. The mixtures are particularly adapted to use in pressureless sintering operations to produce hard, dense, sintered ceramic products. The sintered ceramic product of the present invention comprises a mixture of co-sintered silicon carbide and aluminum nitride with a minor amount of free carbon dispersed therein. The co-sintered portion contains from about 55 to about 99.5 percent by weight silicon carbide co-sintered with from about 0.5 to about 45 percent by weight aluminum nitride. The product contains from about 0.5 to about 4.0, and more usually, from about 1.0 to about 3.0, percent by weight of the product of free or excess carbon remaining from the co-sintering process dispersed within the co-sintered portion. If additional sintering aids are utilized in the sintering process, the final ceramic product may contain minor amounts of such aids or the residual of such aids dispersed therein without deleterious effect. Generally, such aids or residuals are present in amounts of less than about 1.0, and usually, in amounts of from about 0.5 to about 1.0, percent by weight of the composition.

The theoretical density of silicon carbide is 3.21 gm/cc. The sintered silicon carbide - aluminum nitride products of the present invention typically have a density greater than 75 percent of theoretical and usually greater than 85 percent. Co-sintered ceramic products having densities over 90 percent of theoretical may be produced by the present invention. The sintered products undergo a shrinkage of about 10 percent during the sintering process. The sintered products may be utilized in the form or shape in which they are sintered, or they may be machined or processed into more complicated shapes.

The starting components utilized to produce the sintered products of the present invention are silicon carbide, aluminum nitride and combinable carbon, or a combinable carbon source material. Sintering aids, such as boron or a boron source material, may also be present to aid in the sintering step. Generally, the components are present in amounts ranging from about 55.0 percent to about 99.5 percent by weight silicon carbide, from about 0.5 to about 45.0 percent by weight aluminum nitride, and from about 0.5 to about 10.0 percent, and more preferably, from about 4.0 to about 6.0 percent by weight of carbon in the form of free carbon or as the carbon available from a carbon source material. In preparing ceramic materials useful as bricks, crucibles or furnace components, the starting composition preferably contains higher amounts of aluminum nitride, usually in the range of from about 3.0 to about 45.0 percent by weight. In preparing a ceramic material useful for the fabrication of articles, such as turbine blades or high temperature tools, the starting composition preferably contains higher amounts of silicon carbide, usually in the range of from about 90.0 to about 99.0 percent by weight.

The sinterable mixtures of the present invention are particularly adapted to use in substantially pressureless sintering processes to produce the sintered ceramic product of the present invention. In one mode of the invention, the starting components are admixed, the mixture cold pressed to form a green body, and the green body subsequently sintered to form a dense, hard product. In another mode, only the silicon carbide and carbon components are admixed, cold pressed, and sintered in an atmosphere containing aluminum nitride. In either mode, the silicon carbide component and the aluminum nitride component are co-sintered to produce a hard, dense product having the property of being substantially insoluble in warm water.

The silicon carbide starting material may suitably be selected from alpha or beta phase silicon carbide. Mixtures of alpha and beta phase materials may be utilized. The silicon carbide starting material of the present invention does not require separation or purification of phases to obtain a sinterable material. Minor amounts of amorphous silicon carbide may be included without deleterious effect.

The silicon carbide starting material is preferably utilized in finely-divided form. A suitably finely-divided material may be produced by grinding, ball milling or jet milling larger particles of silicon carbide and subsequently classifying or separating a component suited to use in the present invention. Preferably, the silicon carbide starting material has a maximum particle size of about 5 microns and an average particle size of about 0.10 to about 2.50 microns. It is difficult to obtain accurate particle size distribution for silicon carbide powders having a size less than about 1 micron in size, and, therefore, surface area may be considered relevant in determining suitable material. Accordingly, the preferred silicon carbide particles for use in the present powders have a surface area of from about 1 to about 100 $m^2/g$. Within this range, it is more preferred that the surface area of the particles range between about 2 and about 50 $m^2/g$ and, within that range, a range from about 2 to about 20 $m^2/g$ has been found eminently useful.

The aluminum nitride component of the present invention may be utilized in the form of finely-divided powder, if it is to be initially mixed with the other components. Preferably, a particle size of less than 5 microns is utilized, and, more preferably, a particle size less than about 2 microns is desirable. If it is to be utilized to supply a sintering atmosphere of aluminum nitride, it may be utilized in the form of pressed pellets or bodies placed in the sintering furnace. Alternatively, aluminum nitride may be produced in situ in the sintering furnace; however, this method is generally not preferred because of the difficulty in controlling the amount of aluminum nitride in the product and the problem of maintaining furnace conditions conducive to both sintering and to the production of aluminum nitride. A preferred method of providing an aluminum nitride atmosphere in the sintering furnace is by merely positioning compacts or pellets of aluminum nitride of a known weight in the sintering furnace and allowing the aluminum nitride to vaporize during the sintering operation. Suitably, aluminum nitride may be produced by nitriding a mixture of 75 percent by weight aluminum powder and 25 percent by weight aluminum fluoride at a temperature of 1000° C. in an atmosphere of 80 percent nitrogen and 20 percent hydrogen. The nitride product is suitably crushed and may subsequently be pelletted to obtain a useful source of aluminum nitride.

The present starting compositions also contain carbon, or a carbon source, to supply excess or combinable carbon in amounts from about 0.5 to about 10.0, and more preferably, from about 4.0 to about 6.0, percent by weight of the composition. The carbon component facilitates the subsequent sintering operation and aids in reducing the amounts of oxides that might otherwise remain in the finished sintered product. The carbon component may be utilized in any form that facilitates mixing of the carbon component with the silicon carbide component to obtain a dispersion of carbon throughout the mixture. If the carbon component is utilized in finely-divided form, it suitably may be in the form of colloidal graphite. However, a particularly useful form of carbon is a carbon source material, which suitably may be a carbonizable organic material. Such materials may be easily dispersed throughout the silicon carbide component, utilized as a binder in an initial cold pressing or forming operation, and subsequently provide the required excess or combinable carbon by decomposition during the sintering operation. Of particular use are carbonizable organic materials, such as phenolic resins, acrylic resins and polyphenylene resins. Generally, such carbonizable organic materials will provide from about 30 to about 50 percent of their original weight in combinable carbon.

In one mode of carrying out the present invention, the silicon carbide component, the carbon component and the aluminum nitride component are admixed, preferably by dispersing a carbon source material throughout the silicon carbide and aluminum nitride components. The mixture is then cold pressed at a pressure between about 12,000 and about 18,000 psi to form a green body. The green body is subsequently sintered under substantially pressureless sintering conditions to produce a co-sintered product. This mode is particularly adapted to use when the composition contains large, from about 3 to about 45 percent by weight, amounts of aluminum nitride. Such sintered compositions find use in the fabrication of crucibles, refractory briks or furnace components.

In another mode of the invention, the sintered product contains a lesser amount of aluminum nitride, usually from about 0.5 to about 3.0 percent by weight. Such products are suitably produced by initially mixing the silicon carbide and carbon components, cold pressing to form a green body, and sintering the green body in an atmosphere of aluminum nitride. The atmosphere of aluminum nitride may be produced by heating a source of aluminum nitride to a temperature above its vaporization point during the sintering step, or aluminum nitride may be produced in situ during the sintering step. The products of this mode are particularly adapted to use in the fabrication of components for equipment or tools that are to be used under severe wear, high temperature, or corrosive conditions.

The starting mixtures of the present invention may also contain minor amounts of materials that act as sintering aids, for example, boron or boron-containing compounds. Sintering aids are generally effective in the range of from about 0.3 to about 3.0 percent by weight of the silicon carbide component. A boron-containing atmosphere may be provided in the furnace during sintering to aid in densification. In such mode, boron gas may be utilized in the sintering atmosphere or a boron source, for example, $H_3BO_3$ or $B_2O_3$, may be placed in the furnace and allowed to decompose during the sintering operation. In either of the latter modes, a partial pressure of at least about $10^{-7}$ atmospheres of boron is preferably maintained during the sintering operation.

The sintered ceramic products of the present invention are of high density and high strength, substantially non-porous and eminently useful in engineering applications. If desired, the high-density, high-strength silicon carbide product may subsequently be machined, by diamond grinding, electro-chemical machining, ultrasonic machining or by electrical discharge machining techniques to provide tools or machine components requiring close tolerances.

DETAILED DESCRIPTION OF THE INVENTION

The co-sintered portion of the ceramic products of the present invention is comprised of from about 55 to about 99.5 percent by weight of silicon carbide co-sintered with from about 0.5 to about 45 percent by weight of aluminum nitride. The ceramic products of the present invention include minor amounts of free or excess carbon remaining from the co-sintering operation dispersed through the co-sintered portion. Generally, carbon is present in the product in amounts between about 0.5 and about 4.0, and more usually, from about 1.0 to about 3.0, percent by weight of the composition. The products are substantially insoluble in warm water. The sintered products have a bulk density of at least 75 percent of the theoretical density of silicon carbide. For many applications, a density of at least 85 percent of theoretical is desirable, and densities of over 90 percent are obtainable with the mixtures of the present invention.

The silicon carbide starting material is preferably utilized in finely-divided form having a particle size of less than about 5 microns and, more preferably, less than about 2 microns. The silicon carbide starting material has a surface area greater than 8.0 $m^2/g$, and material having a surface area greater than about 20 $m^2/g$ is eminently useful.

The starting carbon component is generally utilized in amounts of from about 0.5 to about 10.0, and more preferably, from about 4.0 to about 6.0, percent by weight of the total composition. The starting carbon component may suitably be utilized in a finely-divided form with a particle size less than about 5 microns and, preferably, less than about 2 microns. However, it is preferred to utilize a carbon source material, such as a carbonizable organic material, which serves the dual purpose of acting as a binder during the cold pressing operation and subsequently as a source of carbon when it carbonizes during the sintering operation. Particularly useful in this mode are organic resins which provide residual carbon in amounts from about 30 to about 50 percent by weight after carbonizing.

The silicon carbide and the carbon or carbon source starting materials are preferably initially thoroughly mixed to obtain a dispersion of the carbon or carbon source material throughout the silicon carbide material.

In one mode of the present invention, particularly where the amount of aluminum nitride desired in the sintered product is between about 3.0 and about 45.0 percent by weight, based on the total weight of the mixture, the aluminum nitride component in finely-divided form is admixed with the silicon carbide and carbon or carbon source material components. A particle size of less than 10 microns is preferred. Eminently useful is a particle size of less than 5 microns and, for ease of even distribution, a particle size of less than about 2 microns is particularly useful.

In another mode of the invention, particularly when the amount of aluminum nitride in the sintered product is between about 0.5 and about 3.0 percent by weight of the mixture, the aluminum nitride component may be added to the silicon carbide - carbon mixture in the vapor state during sintering. In this mode, the silicon carbide and carbon or carbon source components are admixed, shaped by cold pressing, and subsequently sintered in an atmosphere containing between about $5 \cdot 10^{-5}$ and about $1 \cdot 10^{-3}$ atmospheres of aluminum nitride. The aluminum nitride atmosphere may suitably be provided by the inclusion of solid aluminum nitride in the furnace which vaporizes during the sintering process. Alternatively, aluminum nitride may be produced in situ in the furnace during sintering.

The cold pressing step is suitably carried out in a metal die at pressures between about 12,000 and about 18,000 psi. Generally, pressures above about 12,500 psi are useful. Pressures above about 18,000 psi may be utilized; however, minimal beneficial results in the final sintered product are obtained.

A second pressing of the present mixture results in an improvement in the density of the final product. In such process, the mixture is initially cold pressed, crushed to about a 40 mesh size powder, and re-pressed. It is postulated that this process is effective in removing air from the powder particles, which yields a higher green body density and, in turn, a higher sintered product density. However, double pressing is not critical to the present invention, and the improvement is not substantial enough to warrant two pressings as a procedure to be employed in all cases.

The pressed product, green body, typically has a density ranging between about 1.74 and about 1.95 g/cc. The porosity of the green bodies produced by mixtures of the present invention typically range from about 39.3 to about 45.8 percent.

The sintering step is suitably carried out under substantially pressureless conditions utilizing a graphite resistance element furnace. Temperatures between about 1900° and about 2250° C. are eminently useful. Usually, when temperatures less than about 1900° C. are employed, the sintering process does not proceed to produce a desired dense product. Usually, when temperatures over about 2250° C. are employed, deterioration of the sintered product may occur.

The sintering step is preferably carried out in an atmosphere that is inert to the mixtures being sintered. Inert gases, such as argon, helium and nitrogen, may be employed. An atmosphere of ammonia may be utilized. A vacuum in the order of about $10^{-3}$ torr may also be utilized.

Generally, the mixtures of the present invention sinter under the foregoing conditions to produce the desired co-sintered product when sintering times between about 0.25 to about 6.0 hours are employed. Usually, sintering times between about 0.5 to about 2.0 hours are sufficient.

The present invention may be more fully illustrated by the following examples which are not to be interpreted as limiting. Unless otherwise indicated, all parts and percentages are by weight, and all temperatures are in degrees Celsius.

EXAMPLE 1

A mixture containing 95 parts of alpha phase silicon carbide, having an average particle size of less than 5 microns, 1 part of aluminum nitride, also having an average particle size of less than 5 microns, and 4 parts of carbon, using a phenolic resin, a product designated as B178 Resin by Varcum Chemical Division, Reichhold Chemicals, Inc., was made by ball milling the components in an acetone slurry for a period of 8 hours. The mixture was then dried at room temperature over a period of about 12 hours. The dry mixture was then crushed by dry ball milling and screened through an 80 mesh screen.

The screened powder was then cold pressed at 15,000 psi using a metal die to produce a green body ½" in diameter and ½" in height. The green body had a density of 1.88 g/cc. The body was then allowed to dry at room temperature and subsequently was heated at 110° in air for a period of 1 hour to cure the phenolic resin composition.

The green body was then sintered under substantially pressureless conditions in a graphite resistance element furnace at a temperature of 2150° for a period of 30 minutes in an argon atmosphere. The co-sintered product was found to have undergone a linear shrinkage of 10.98%. The product had a porosity of 2.91% and a bulk density of 3.00 g/cc, which corresponds to 93.30% of the theoretical density of silicon carbide.

This example is shown in the following table as Example 1. Examples 2 through 10 were conducted in a similar manner.

TABLE I

| Example | Composition | | | Green Density g/cc | Shrinkage Percent | Porosity | Density | |
|---|---|---|---|---|---|---|---|---|
| | AlN | Carbon | SiC | | | | Bulk g/cc | % of SiC |
| 1 | 1.0 | 4.0 | 95.0 | 1.88 | 10.98 | 2.91 | 3.00 | 93.30 |
| 2 | 1.0 | 2.0 | 97.0 | 1.82 | 6.67 | 16.35 | 2.54 | 79.00 |
| 3 | 1.0 | 6.0 | 93.0 | 1.94 | 9.56 | 4.56 | 2.82 | 87.94 |
| 4 | 2.0 | 6.0 | 92.0 | 1.91 | 12.44 | 5.79 | 2.64 | 82.31 |
| 5 | 4.0 | 6.0 | 90.0 | 1.91 | 11.95 | 9.21 | 2.58 | 80.34 |
| 6 | 10.0 | 6.0 | 84.0 | 1.96 | 10.98 | 3.47 | 2.88 | 90.80 |
| 7 | 20.0 | 6.0 | 74.0 | 1.96 | 10.15 | 4.53 | 2.87 | 89.50 |
| 8 | 30.0 | 6.0 | 64.0 | 1.98 | 11.11 | 4.37 | 2.87 | 89.50 |
| 9* | 1.0 | 0.0 | 99.0 | 1.83 | 0.89 | 27.80 | 2.23 | 69.56 |
| 10** | 1.0 | 4.0 | 95.0 | 1.95 | 8.98 | 5.23 | 2.89 | 90.16 |

*Control
**Beta phase silicon carbide used

EXAMPLE 11

A mixture of 96.0 parts alpha phase silicon carbide having an average particle size less than 5 microns and 4.0 parts of carbon, using a B-178 phenolic resin composition, was made by ball milling the silicon carbide and resin components in a slurry of acetone for a period of eight hours. The mixture was dried at room temperature and processed as in Example 1 to produce a green body. The green body was placed in the sintering furnace along with a pellet of aluminum nitride. A sintering temperature of 1950° was maintained for a period of 30 minutes with an argon atmosphere. The partial pressure of aluminum nitride was calculated to be about $5 \cdot 10^{-5}$ atmospheres. The sintered product was found to have a porosity of 4.25% and a bulk density of 2.62 g/cc, corresponding to 81.62% of the theoretical density of silicon carbide.

Example 11 is shown in Table II. Examples 12 through 16 were conducted in a similar manner.

TABLE II

| Example | Composition | | | Green Density g/cc | Shrinkage Percent | Porosity | Density | |
|---|---|---|---|---|---|---|---|---|
| | AlN | Carbon | SiC | | | | Bulk g/cc | % of SiC |
| 11 | 0.0 | 4.0 | 96.0 | 1.82 | 11.84 | 4.25 | 2.62 | 81.62 |
| 12 | 1.0 | 4.0 | 95.0 | 1.84 | 13.36 | 3.24 | 2.66 | 82.96 |
| 13 | 1.0 | 6.0 | 93.0 | 1.92 | 11.22 | 8.97 | 2.55 | 79.47 |
| 14*** | 1.0 | 4.0 | 95.0 | 1.90 | 10.74 | 3.10 | 2.90 | 90.59 |
| 15*** | 1.0 | 6.0 | 93.0 | 1.94 | 9.78 | 3.77 | 2.94 | 91.59 |
| 16**** | 1.0 | 4.0 | 95.0 | 1.78 | 17.51 | 3.55 | 2.86 | 89.17 |

***Pressed twice
****$H_3BO_3$ added in furnace atmosphere

It will be appreciated that the present invention is not to be considered as limited to the specific examples and embodiments given in the foregoing and that various modifications may be made within the ordinary skill of the art without departing from the spirit and scope of the invention.

What is claimed is:

1. A method of producing a co-sintered silicon carbide - aluminum nitride product which comprises the steps of:
    (a) forming a mixture of finely-divided silicon carbide, aluminum nitride, and carbon, or a carbon source material,
    (b) shaping said mixture into an initial green body by cold pressing,
    (c) crushing and reforming the initial green body into a second green body,
    (d) sintering the second green body under substantially pressureless conditions in an inert atmosphere at a temperature between about 1900° and about 2250° C., and
    (e) recovering a co-sintered silicon carbide - aluminum nitride product having a density of at least 75 percent of the theoretical density of silicon carbide.

2. The method of claim 1 wherein the mixture of silicon carbide, aluminum nitride, and carbon is comprised of from about 55.0 to about 99.5 percent by weight silicon carbide, from about 0.5 to about 45.0 percent aluminum nitride, and from about 0.5 to about 10.0 percent by weight carbon.

3. The method of claim 1 wherein the particle size of the silicon carbide, aluminum nitride, and carbon components is less than 5 microns.

4. The method of claim 1 wherein the carbon component is in the form of a carbonizable organic material.

5. The method of claim 4 wherein the carbonizable organic material is a phenolic resin.

6. The method of claim 1 wherein the cold pressing step is carried out at pressures between about 12,000 and about 18,000 psi.

7. The method of claim 1 which includes a sintering aid of boron or a boron source material added to the initial mixture in an amount of from about 0.3 to about 5.0 percent by weight of the silicon carbide component.

8. The method of claim 1 wherein the atmosphere during sintering contains at least about $10^{-7}$ atmospheres of boron.

9. A method of producing a co-sintered silicon carbide - aluminum nitride product which comprises the steps of:

(a) forming a mixture of finely-divided silicon carbide and carbon, or a carbon source material, (b) shaping said mixture into a green body by cold pressing, (c) sintering said green body under substantially pressureless conditions in an inert atmosphere containing from about $5 \cdot 10^{-5}$ to about $1 \cdot 10^{-3}$ atmospheres of aluminum nitride at a temperature between about 1900° and about 2250° C., and (d) recovering a co-sintered silicon carbide - aluminum nitride product having a density of at least 75 percent of the theoretical density of silicon carbide.

10. The method of claim 9 wherein the mixture of silicon carbide and carbon is comprised of from about 90.0 to about 99.0 percent by weight silicon carbide and from about 1.0 to about 10.0 percent by weight carbon.

11. The method of claim 9 wherein the particle size of the silicon carbide, aluminum nitride, and carbon components is less than 5 microns.

12. The method of claim 9 wherein the carbon component is in the form of a carbonizable organic material.

13. The method of claim 12 wherein the carbonizable organic material is a phenolic resin.

14. The method of claim 9 wherein the cold pressing step is carried out at pressures between about 12,000 and about 18,000 psi.

15. The method of claim 9 which includes a sintering aid of boron or a boron source material added to the initial mixture in an amount of from about 0.3 to about 5.0 percent by weight of the silicon carbide component.

16. The method of claim 9 wherein the atmosphere during sintering contains at least about $10^{-7}$ atmospheres of boron.

17. The method of claim 9 wherein the initial green body of step (b) is crushed and reformed into a second green body.

* * * * *